(12) United States Patent
Lee et al.

(10) Patent No.: US 9,606,690 B2
(45) Date of Patent: Mar. 28, 2017

(54) TOUCH PANEL HAVING TOUCH ELECTRODES AND OVERCOAT FORMED IN A ZIGZAG MANNER

(71) Applicant: Hydis Technologies Co., Ltd, Gyeonggi-do (KR)

(72) Inventors: Ji Hoon Lee, Seoul (KR); Joon Sung An, Seoul (KR); Seong Jung Yun, Gyeonggi-do (KR); Hyung Jung Kim, Gyeonggi-do (KR)

(73) Assignee: HYDIS TECHNOLOGIES CO., LTD., Gyeonggi-Do (KR)

( * ) Notice: Subject to any disclaimer, the term of this patent is extended or adjusted under 35 U.S.C. 154(b) by 50 days.

(21) Appl. No.: 14/789,044

(22) Filed: Jul. 1, 2015

(65) Prior Publication Data
US 2016/0018930 A1  Jan. 21, 2016

(30) Foreign Application Priority Data

Jul. 15, 2014 (KR) .......................... 10-2014-0089316

(51) Int. Cl.
*G06F 3/044* (2006.01)
*G06F 3/047* (2006.01)

(52) U.S. Cl.
CPC .............. *G06F 3/044* (2013.01); *G06F 3/047* (2013.01); *G06F 2203/04103* (2013.01); *G09G 2300/0426* (2013.01)

(58) Field of Classification Search
CPC ........... G06F 3/044; G06F 2203/04103; G06F 3/047; G06F 3/0418; G09G 2300/0426
See application file for complete search history.

(56) References Cited

U.S. PATENT DOCUMENTS

| 2015/0212632 A1* | 7/2015 | Wang ...................... G06F 3/044 345/173 |
| 2015/0338943 A1* | 11/2015 | Donnelly ................ G06F 3/041 345/173 |

FOREIGN PATENT DOCUMENTS

KR   1020140021948   2/2014

OTHER PUBLICATIONS

Korean Office action from counterpart Korean Application (KR Patent Application No. 10-2014-0089316) issued on Oct. 15, 2015, 4 pages.

* cited by examiner

*Primary Examiner* — Larry Sternbane
(74) *Attorney, Agent, or Firm* — Cooper Legal Group LLC (57) ABSTRACT

A touch panel may include: a substrate; touch electrodes formed on the substrate as zigzag lines consisting of first unit electrodes disposed to be inclined in one direction with respect to a first axis that is parallel to one side of the substrate and second unit electrodes disposed to be inclined in the other direction with respect to the first axis, the first unit electrodes and second unit electrodes being disposed to alternate each other consecutively in a direction of the first axis; and overcoating layer formed as zigzag lines consisting of first overcoating members disposed to be inclined in a direction intersecting with the first unit electrodes, and second overcoating members disposed to be inclined in a direction intersecting with the second unit electrodes, the first overcoating members and second overcoating members disposed to alternate each other consecutively in the direction of the first axis.

8 Claims, 7 Drawing Sheets

FIG 1

Prior Art

FIG 2

Prior Art

TOUCH PANEL HAVING TOUCH ELECTRODES AND OVERCOAT FORMED IN A ZIGZAG MANNER

CROSS-REFERENCE TO RELATED APPLICATION

This application claims the benefit of priority under 35 U.S.C. §119(a) of Korean Patent Application No.10-2014-0089316, filed on Jul. 15, 2014, in the Korean Intellectual Property Office, the entire disclosure of which is incorporated herein by reference for all purposes.

BACKGROUND

1. Field

The present invention relates to a touch panel, and more particularly to, a touch panel capable of preventing a moiré phenomenon due to interference with a diffusion film or a thin film transistor (TFT) array overlapped with touch electrodes as well as improving a visibility defect of the touch electrodes, by configuring the touch electrodes as single layer type electrodes having a high degree of resolution.

2. Description of Related Art

In general, touch screens may be configured to include a touch panel, a controller, an integrated circuit (IC), and a driver switch, and the touch panel may have a stacked structure formed of a film having a transparent conductive layer (indium tin oxide: ITO) deposited thereon, or glass.

Capacitive type touch panels may be classified as display attached types having the GFF (1Glass-2Film-2Layer) structure in which two layers of transparent conductive film are used, cover window integrated types having the G1F (1Glass-1Film-2Layer) structure and the G2 (2Glass-2Layer) structure in which a single transparent conductive layer is used, and display integrated types having the On-Cell structure and the In-Cell structure.

In such touch panels, the number of transparent conductive layers formed on the touch panel, and shapes thereof may be varied depending on a change in the structure of touch electrodes. In general, the touch electrodes may be formed to have one or more lines or a certain surface and depending on a structure of the touch panel, may be regularly disposed over the overall display region.

In existing GFF type touch panels, a touch electrode structure in which two layers of transparent conductive film for sensing an X-axis signal and an Y-axis signal are stacked has been designed. Recently, in order to increase a degree of resolution in existing touch devices, touch electrodes may be designed to be densely formed, or the attempt to reduce two layers of transparent conductive film such as in the G1 structure into a single layer has been expanding. That is, in configuring a touch electrode structure using a single layer, since stacked structures separated in an X-axis and a Y-axis in existing cases need to be formed in a single layer, touch electrodes have been gradually designed to have a fine, complicated structure.

When groups of fine touch electrodes regularly disposed are overlapped with pixel patterns of a display panel generally used, a wave pattern phenomenon which is an optical phenomenon generated when two or more patterns having a regular periodicity are overlapped with each other, that is, a moiré phenomenon, may occur, thereby eventually degrading image quality of the display.

Figure 1:
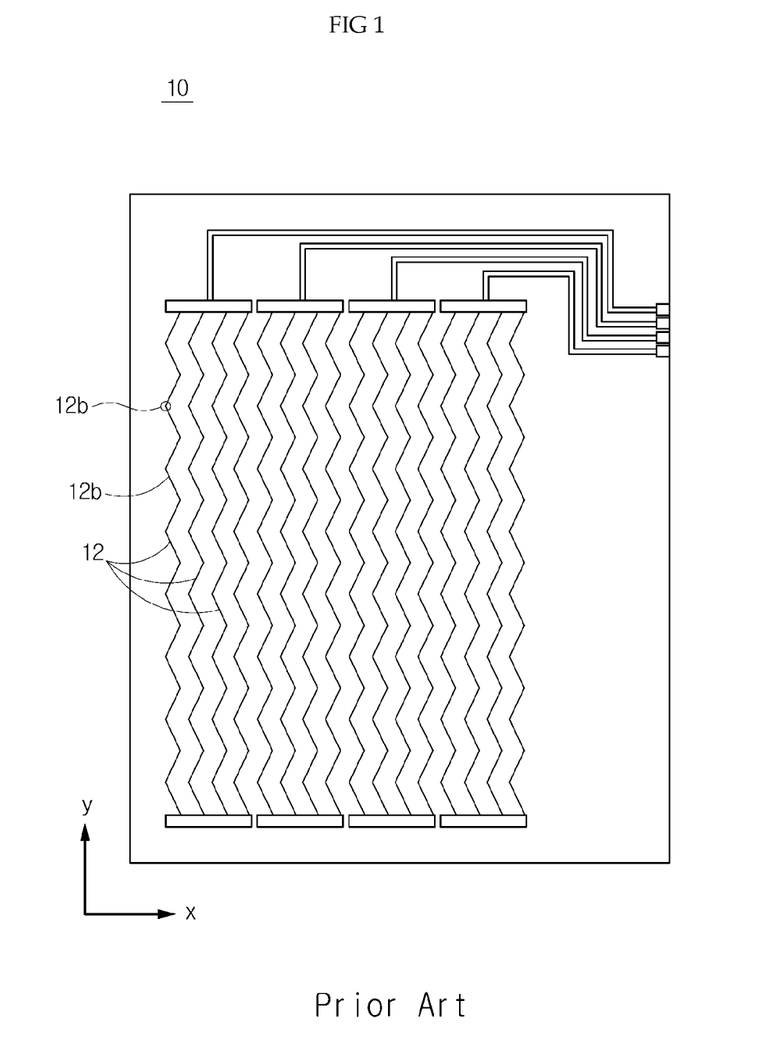
FIG. 1 is a plane configuration view schematically illustrating touch electrodes of a touch panel according to the related art.

In order to prevent the occurrence of a moiré phenomenon, technologies of repeatedly, consecutively disposing a plurality of electrodes 12a inclined in opposite directions, in an alternate manner, as in FIG. 1, to form unit electrode lines 12 on a transparent substrate in a zigzag form, have been used. That is, the unit electrode lines 12 may be disposed to be offset from pixel patterns of a display panel by a predetermined angle to thereby prevent a moiré phenomenon.

Figure 2:
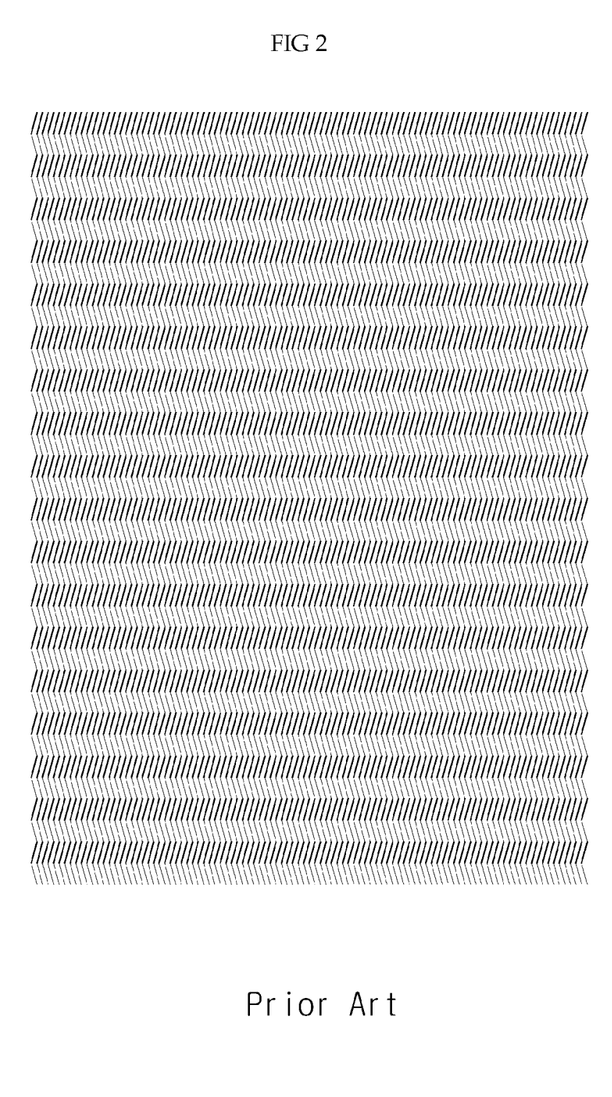
FIG. 2 is a view illustrating visibility defects of the touch electrodes for preventing a moiré phenomenon, applied to the touch panel according to the related art.

In a touch panel 10 in the related art as described above, a moiré phenomenon may be prevented, but since the electrode lines 12a inclinedly disposed and bent portions 12b formed at connection points at which portions of the electrode lines 12a inclinedly disposed in opposite directions are connected to each other may be repeatedly disposed in parallel in a horizontal direction, the electrode lines 12a and the bent portions 12b configuring the unit electrode lines 12, there are defects in which such portions are recognized as line forms as illustrated in FIG. 2.

SUMMARY

Therefore, an aspect of exemplary embodiments of the present invention may provide a touch panel capable of preventing a moiré phenomenon due to interference with a diffusion film or a thin film transistor (TFT) array overlapped with touch electrodes as well as improving a visibility defect of the touch electrodes, by configuring the touch electrodes as single layer type electrodes having a high degree of resolution.

According to an embodiment of the present invention, a touch panel may include: a transparent substrate; touch electrodes formed on the transparent substrate as zigzag lines consisting of first unit electrodes disposed to be inclined in one direction with respect to a first axis that is parallel to one side of the transparent substrate and second unit electrodes disposed to be inclined in the other direction with respect to the first axis, the first unit electrodes and second unit electrodes being disposed to alternate each other consecutively in a first axis direction; and overcoating layer formed as zigzag lines consisting of first overcoating members disposed to be inclined in a direction intersecting with the first unit electrodes, and second overcoating members disposed to be inclined in a direction intersecting with the second unit electrodes, the first overcoating members and second overcoating members disposed to alternate each other consecutively in the first axis direction, wherein the zigzag lines of the touch electrodes are symmetrical to the zigzag lines of the overcoating layer with respect to the first axis.

The first overcoating members and the second unit electrodes may be disposed in parallel with each other and the second overcoating members and the first unit electrodes may be disposed in parallel with each other.

The first overcoating members and the second unit electrodes adjacent to end portions of the first overcoating members may be disposed on a common axial line, and the second overcoating members and the first unit electrodes adjacent to end portions of the second overcoating members may be disposed on a common axial line.

The first unit electrodes and first overcoating members, and the second unit electrodes and second overcoating members may be disposed in a second axial direction that is perpendicular to the first axis direction, such that the first unit electrodes and first overcoating members alternate each other consecutively, and the second unit electrodes and second overcoating members alternate each other consecutively in the second axis direction.

The overcoating layer may be formed to protrude from an upper surface of an insulating base layer stacked on an upper portion of the transparent substrate on which the touch electrodes are formed.

DETAILED DESCRIPTION

Exemplary embodiments of the present invention disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Prior to the description, in several embodiments, components having the same configurations will be described using the same reference numerals representatively in a first exemplary embodiment, and other components different from those of the first exemplary embodiment will be described in other exemplary embodiments.

Hereinafter, a touch panel according to an exemplary embodiment of the present invention will be described in detail with reference to the attached drawings.

Figure 3:
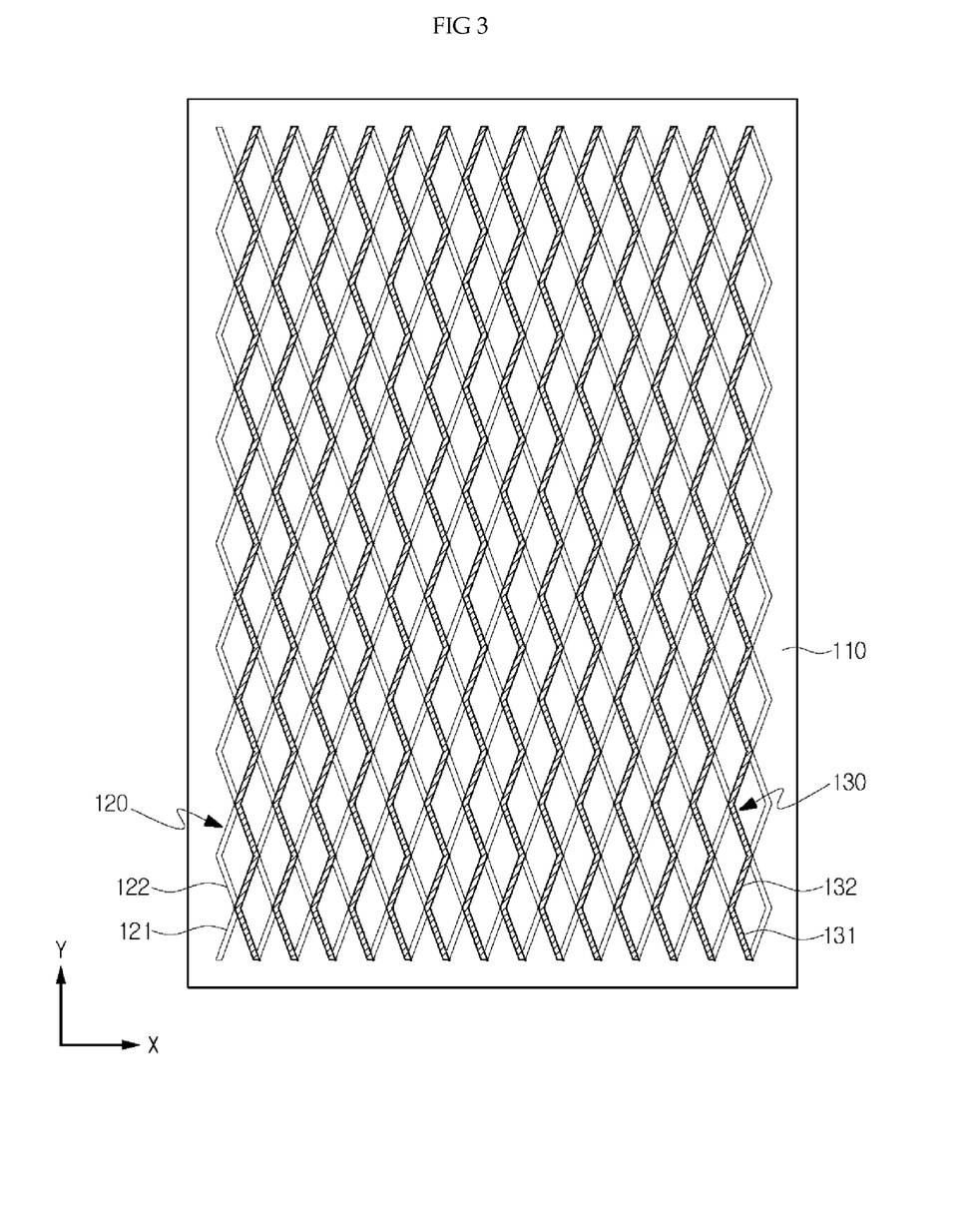
FIG. 3 is a plan view of a touch panel according to an exemplary embodiment of the present invention.
Figure 4:
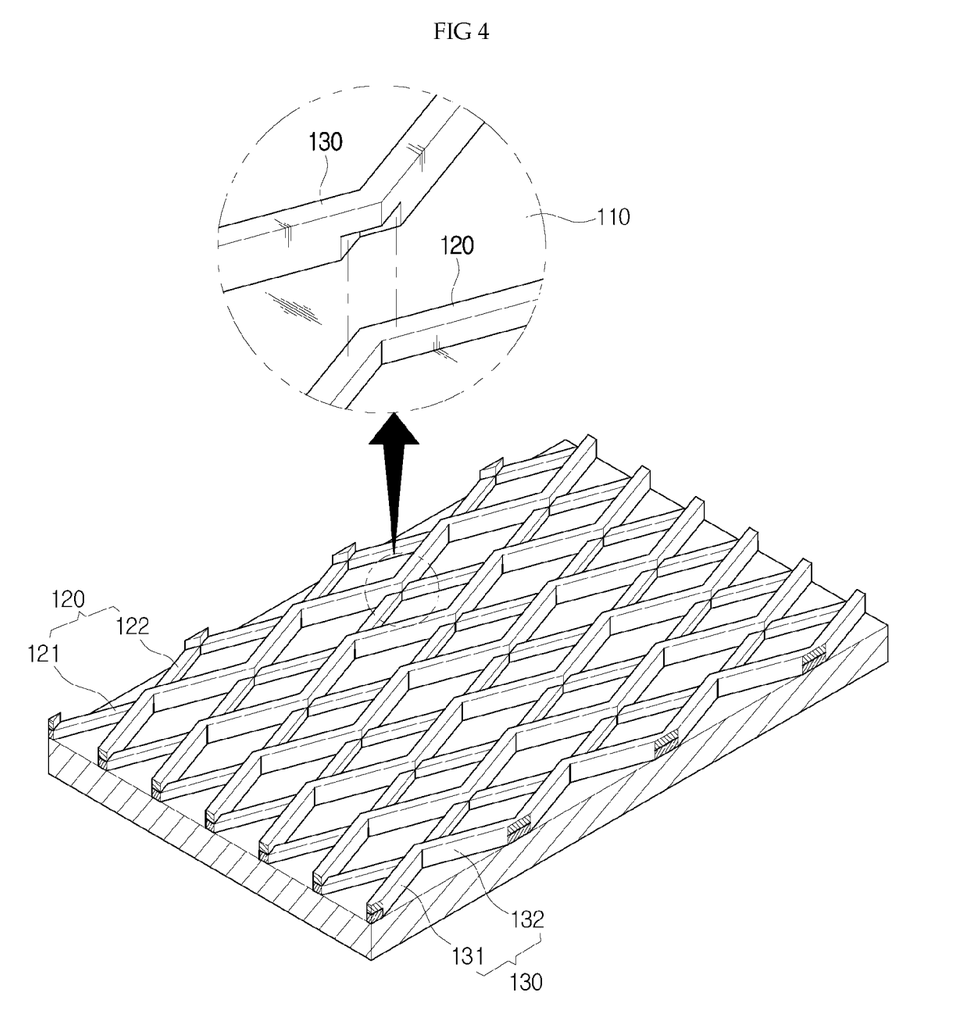
FIG. 4 is an enlarged perspective view of a portion of FIG. 3.
Figure 5A:
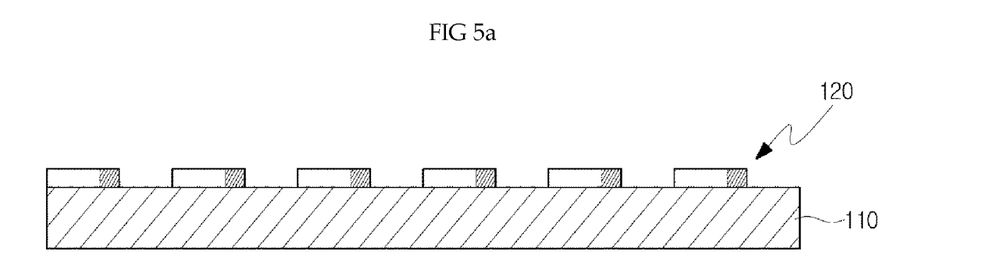
FIGS. 5a through 5c are cross-sectional views of respective manufacturing processes, illustrating a process of manufacturing a touch panel according to an exemplary embodiment of the present invention.
Figure 5B:
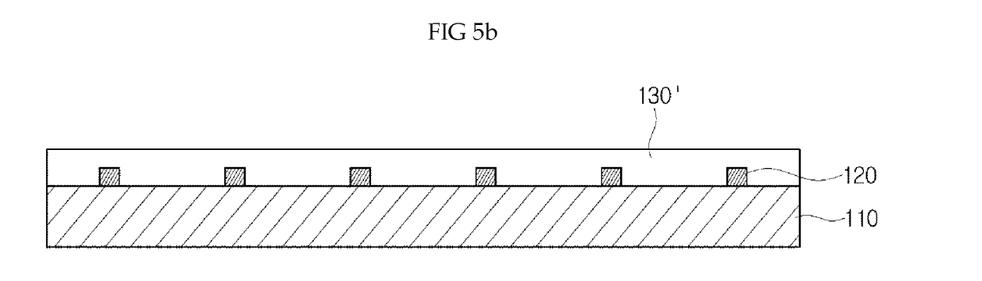
Figure 5C:
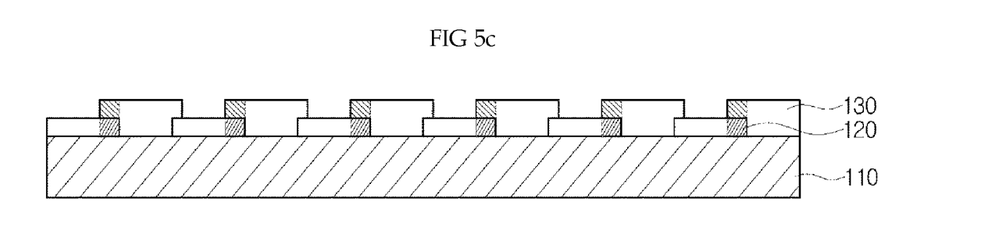

FIG. 3 is a plan view of a touch panel according to an exemplary embodiment of the present invention. FIG. 4 is an enlarged perspective view of a portion of FIG. 3. FIGS. 5a through 5c are cross-sectional views of respective manufacturing processes, illustrating a process of manufacturing a touch panel according to an exemplary embodiment of the present invention.

As illustrated in the drawings, the touch panel according to an exemplary embodiment of the present invention may be configured to include touch electrodes 120 formed of a transparent conductive material having a high degree of transmittance, such as indium tin oxide (ITO) and respectively formed on a transparent substrate 110 as single layers, and overcoating layer 130 formed of a transparent organic insulating material such as acrylic resin and formed on upper portions of the touch electrodes 120.

The touch electrodes 120 may include first unit electrodes 121 disposed to be inclined in one direction (clockwise) at an angle of 10 to 20 degrees with respect to first axis (Y) in parallel with a side of the transparent substrate 110 and second unit electrodes 122 disposed to be inclined in the other direction (counterclockwise) at an angle of 10 to 20 degrees with respect to the first axis (Y). The touch electrodes 120 may form zigzag lines by consecutively alternating the first unit electrodes 121 and the second unit electrodes 122 in a first axis (Y) direction. The zigzag lines may be disposed to be spaced apart from each other by predetermined distances in a second (X) axis direction perpendicular with respect to the first axis (Y) direction, such that the zigzag lines may be regularly disposed over the entire region of the transparent substrate 110.

The overcoating layer 130 may include first overcoating members 131 disposed to be inclined in a direction intersecting with the first unit electrodes 121 from positions thereof symmetrical to the first unit electrodes 121, and second overcoating members 132 disposed to be inclined in a direction intersecting with the second unit electrodes 122 from positions thereof symmetrical to the second unit electrodes 122. The overcoating layer 130 may form zigzag lines on upper portions of the touch electrodes 120 by consecutively alternating the first overcoating members 131 and the second overcoating members 132 in the first axis (Y) direction. The zigzag lines may be disposed to be spaced apart from each other by predetermined distances in the second (X) axis direction perpendicular with respect to the first axis (Y) direction, such that the zigzag lines may be regularly disposed over the entire region of the transparent substrate 110.

Here, a direction of the first overcoating members 131 which are intersected with the first unit electrodes 121 is parallel with a direction of the second unit electrodes 122, while a direction of the second overcoating members 132 which are intersected with the second unit electrodes 122 is parallel with a direction of the first unit electrodes 121. Distances by which the first overcoating members 131 and second overcoating members 132 are disposed in the first axis (Y) direction may be set to be identical to distances by which the first unit electrodes 121 and second unit electrodes 122 are disposed in the first axis (Y) direction. Thus, the overcoating layer 130 may be symmetrical to the touch electrodes 120 with respect to the first axis (Y).

In addition, the touch electrodes 120 and the overcoating layer 130 may be alternately disposed in the second (X) axis direction. That is, end portions of the first overcoating members 131 may be overlapped with end portions of the second unit electrodes 122 adjacent thereto, such that the first overcoating members 131 and the second unit electrodes 122 adjacent thereto may be disposed on a common axial line. In addition, end portions of the second overcoating members 132 may be overlapped with end portions of the first unit electrodes 121 adjacent thereto, such that the second overcoating members 132 and the first unit electrodes 121 adjacent thereto may be disposed on a common axial line.

According to such a disposition structure, the touch electrodes 120 and the overcoating layer 130 may be in the form of a net having parallelogram meshes.

The first overcoating members 131 inclined in the direction intersecting with the first unit electrodes 121 may be arranged to be parallel with each other in the second (X) axis direction in a region between the first unit electrodes 121 arranged in parallel with each other in the second (X) axis direction. In a similar manner, the second overcoating members 132 inclined in the direction intersecting with the second unit electrodes 122 may be arranged in the second (X) axis direction in a region between the second unit electrodes 122 arranged in the second (X) axis direction.

Thus, visibility of the first unit electrodes 121 and the second unit electrodes 122 that are inclined in order to prevent a moiré phenomenon can be lowered.

Further, the first overcoating members 131 intersecting with the first unit electrodes 121 and the second unit electrodes 122 adjacent thereto in the first axis (Y) direction may be inclinedly disposed in the same direction, and the second overcoating members 132 intersecting with the second unit electrodes 122 and the first unit electrodes 121 adjacent thereto in the first axis (Y) direction may be inclinedly disposed in the same direction, such that visibility of the first overcoating members 131 and the second overcoating members 132 may be lowered.

That is, the touch electrodes 120 may be arranged in a zigzag manner and thus, be disposed to be offset from a linear pattern of a TFT array panel and a diffusion film of a display panel to thereby prevent a moiré phenomenon. In addition, the overcoating layer 130 disposed on the upper portions of the touch electrodes 120 may be arranged in a zigzag form symmetrical to the touch electrodes 120, such that the touch electrodes 120 and the overcoating layer 130 may be in the form of a net having parallelogram meshes. Thus, visibility defects due to repeated arrangements of the first unit electrodes 121 and the second unit electrodes 122 that are inclinedly disposed, in the second (X) axis direction, may be solved.

According to such a configuration, although the touch electrodes 120 are configured as a single layer, a moiré phenomenon and visibility may be simultaneously improved. Therefore, deterioration in image quality of a display panel due to the touch panel can be prevented.

The overcoating layer 130 configured of the first overcoating members 131 and the second overcoating members 132 may be formed on the upper portions of the touch electrodes 120 by stacking a transparent organic insulating material 130' such as acrylic resin or the like as illustrated in FIG. 5b on the transparent substrate 110 on which the touch electrodes 120 are formed as illustrated in FIG. 5a, at a predetermined thickness, and subsequently, removing a pre-set region of the organic insulating material 130' using photolithography technology as illustrated in FIG. 5c.

That is, in the exemplary embodiment, in the case that the touch electrodes 120 are formed in a zigzag manner so as to prevent a moiré phenomenon, in order to prevent the touch electrodes from being recognized as domain block forms based on a line connecting points at which angles of the touch electrodes 120 are changed, that is, intersections at which the first unit electrodes 121 and the second unit electrodes 122 contact each other, in the second (X) axis direction, the zigzag lines symmetrical to those of the touch electrodes 120 may be formed on the overcoating layer 130 stacked on the touch electrodes 120. Thus, the patterns of lines of the touch electrodes 120, repeatedly arranged in parallel with each other in the second (X) axis direction may be offset, and at the same time, domain blocks may be divided into portions to prevent the touch electrodes from being recognized.

Figure 6:
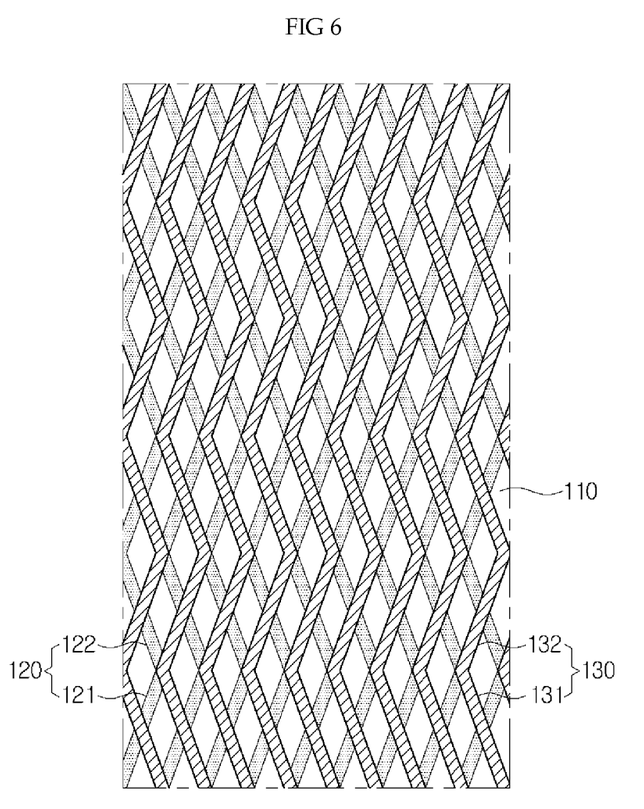
FIG. 6 is a plane view illustrating a configuration of a touch panel according to another exemplary embodiment of the present invention; and, FIGS. 7a through 7c are cross-sectional views of respective manufacturing processes, illustrating a process of manufacturing a touch panel according to an exemplary embodiment of the present invention.

Meanwhile, the exemplary embodiment exemplifies a case in which the first overcoating members 131 and the second overcoating members 132 of the overcoating layer 130 consecutively alternate with the first unit electrodes 121 and the second unit electrodes 122 of the touch electrodes 120 in the second (X) axis direction. However, in order to increase the degree of resolution of the touch panel, the touch electrodes 120 may be densely disposed in the second (X) axis direction. In this case, the overcoating layer 130 may be densely disposed at intervals identical to those at which the touch electrodes 120 are disposed, thereby preventing an increase in visibility of the touch electrodes 120.

Figure 7A:
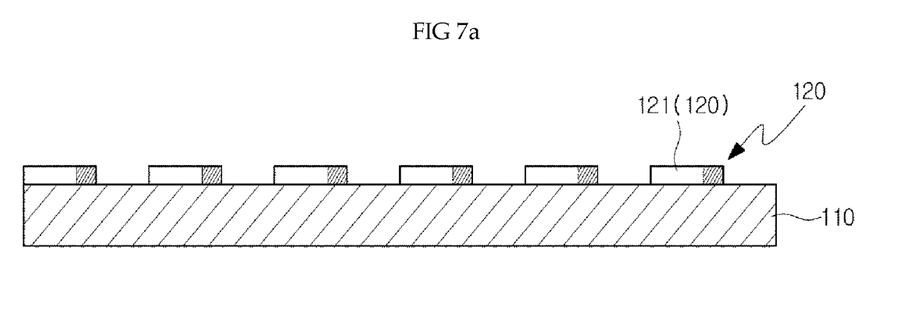
Figure 7B:
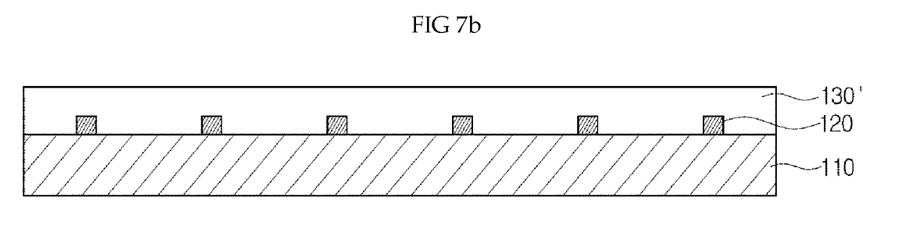
Figure 7C:
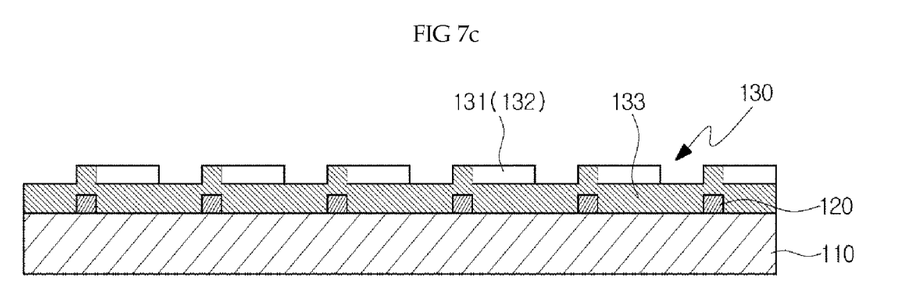

FIGS. 7a through 7c are cross-sectional views of respective manufacturing processes, illustrating a process of manufacturing a touch panel according to an exemplary embodiment of the present invention.

The transparent organic insulating material 130' such as acrylic resin or the like as illustrated in FIG. 7b may be stacked on the transparent substrate 110 on which the touch electrodes 120 are formed as illustrated in FIG. 7a, at a predetermined thickness. Then, during an exposure operation of the photolithography technology as in FIG. 7c, only a portion of the organic insulating material may be removed to a predetermined depth using a half-tone mask, such that a base layer 133 completely covering the touch electrodes 120 to protect the touch electrodes 120 from the organic insulating material 130', and the overcoating layer 130 including the first overcoating members 131 and the second overcoating members 132 that are formed on an upper surface of the base layer 133 to prevent the touch electrodes 120 from being recognized, may be formed.

Meanwhile, although the exemplary embodiment exemplifies a case in which the base layer 133 and the overcoating layer 130 are simultaneously formed in a single process and are integrally configured, the base layer 133 may be first formed and subsequently, the overcoating layer 130 may be formed on the upper portion of the base layer 133 in separate processes.

According to the exemplary embodiment of the present invention, since the first overcoating members 131 and the second overcoating members 132 are formed on the upper portion of the base layer 133, it may be possible to protect the touch electrodes 120 by preventing the exposure of the touch electrodes 120 as well as to prevent the touch electrodes 120 from being recognized.

As set forth above, according to exemplary embodiments of the present invention, a touch panel capable of preventing a moiré phenomenon due to interference with a diffusion film or a thin film transistor (TFT) array overlapped with touch electrodes by configuring the touch electrode as a single layer type electrode having a high degree of resolution, may be provided. In addition, a touch panel capable of improving a visibility defect of the touch electrode by configuring an overcoating layer formed on an upper portion of the touch electrode in a zigzag form symmetrical to that of the touch electrode, may be provided.

While the present disclosure has been shown and described in connection with the embodiments, it will be apparent to those skilled in the art that modifications and variations can be made without departing from the spirit and scope of the disclosure as defined by the appended claims.

What is claimed is:

1. A touch panel comprising:
   a transparent substrate;
   touch electrodes formed on the transparent substrate as zigzag lines consisting of first unit electrodes disposed to be inclined in one direction with respect to a first axis that is parallel to one side of the transparent substrate and second unit electrodes disposed to be inclined in the other direction with respect to the first axis, the first unit electrodes and second unit electrodes being disposed to alternate each other consecutively in a direction of the first axis; and overcoating layer formed as zigzag lines consisting of first overcoating members disposed to be inclined in a direction intersecting with the first unit electrodes, and second overcoating members disposed to be inclined in a direction intersecting with the second unit electrodes, the first overcoating members and second overcoating members disposed to alternate each other consecutively in the direction of the first axis, wherein the zigzag lines of the touch electrodes are symmetrical to the zigzag lines of the overcoating layer with respect to the first axis.

2. The touch panel of claim 1, wherein the first overcoating members and the second unit electrodes are disposed in parallel with each other and the second overcoating members and the first unit electrodes are disposed in parallel with each other.

3. The touch panel of claim 2, wherein the first unit electrodes and first overcoating members, and the second unit electrodes and second overcoating members are disposed in a second axial direction that is perpendicular to the first axis direction, such that the first unit electrodes and first overcoating members alternate each other consecutively, and the second unit electrodes and second overcoating members alternate each other consecutively in the second axis direction.

4. The touch panel of claim 3, wherein the overcoating layer is formed to protrude from an upper surface of an insulating base layer stacked on an upper portion of the transparent substrate on which the touch electrodes are formed.

5. The touch panel of claim 2, wherein the overcoating layer is formed to protrude from an upper surface of an insulating base layer stacked on an upper portion of the transparent substrate on which the touch electrodes are formed.

6. The touch panel of claim 1, wherein the first overcoating members and the second unit electrodes adjacent to end portions of the first overcoating members are disposed on a common axial line, and the second overcoating members and the first unit electrodes adjacent to end portions of the second overcoating members are disposed on a common axial line.

7. The touch panel of claim 6, wherein the overcoating layer is formed to protrude from an upper surface of an insulating base layer stacked on an upper portion of the transparent substrate on which the touch electrodes are formed.

8. The touch panel of claim 1, wherein the overcoating layer is formed to protrude from an upper surface of an insulating base layer stacked on an upper portion of the transparent substrate on which the touch electrodes are formed.

* * * * *

UNITED STATES PATENT AND TRADEMARK OFFICE
CERTIFICATE OF CORRECTION

PATENT NO. : 9,606,690 B2  
APPLICATION NO. : 14/789044  
DATED : March 28, 2017  
INVENTOR(S) : Ji Hoon Lee et al.

It is certified that error appears in the above-identified patent and that said Letters Patent is hereby corrected as shown below:

Column 3, Line 14: please delete the word "plan" and insert therefor --plane--

Signed and Sealed this  
Sixth Day of June, 2017

Michelle K. Lee  
*Director of the United States Patent and Trademark Office*